US011659086B2

(12) United States Patent
Matula et al.

(10) Patent No.: US 11,659,086 B2
(45) Date of Patent: May 23, 2023

(54) TUNABLE CHATBOTS

(71) Applicant: Avaya Management L.P., Durham, NC (US)

(72) Inventors: Valentine C. Matula, Granville, OH (US); David Chavez, Broomfield, CO (US); Dragan Grebovich, Amesbury, MA (US)

(73) Assignee: Avaya Management L.P., Durham, NC (US)

( * ) Notice: Subject to any disclaimer, the term of this patent is extended or adjusted under 35 U.S.C. 154(b) by 157 days.

(21) Appl. No.: 17/107,174

(22) Filed: Nov. 30, 2020

(65) Prior Publication Data

US 2021/0359961 A1 Nov. 18, 2021

Related U.S. Application Data

(60) Provisional application No. 63/026,561, filed on May 18, 2020.

(51) Int. Cl.
*H04M 3/51* (2006.01)
*G06F 40/51* (2020.01)
*G06F 40/56* (2020.01)
*H04L 51/02* (2022.01)
*H04L 67/00* (2022.01)

(52) U.S. Cl.
CPC .......... *H04M 3/5166* (2013.01); *G06F 40/51* (2020.01); *G06F 40/56* (2020.01); *H04L 51/02* (2013.01); *H04L 67/34* (2013.01); *H04M 3/5175* (2013.01)

(58) Field of Classification Search
CPC ... H04M 3/5166; H04M 3/5175; G06F 40/51; G06F 40/56; H04L 51/02; H04L 67/34
USPC .............. 704/9; 379/265.09, 265.05, 265.11, 379/265.12, 265.01, 242, 265.06, 265.07
See application file for complete search history.

(56) References Cited

U.S. PATENT DOCUMENTS

| 10,498,898 B2 | 12/2019 | Mazza et al. |
| 10,645,225 B1 | 5/2020 | Stoops et al. |
| 2019/0325868 A1* | 10/2019 | Lecue ..................... G10L 25/63 |
| 2021/0144107 A1* | 5/2021 | Liang ....................... G06N 5/04 |
| 2021/0150150 A1* | 5/2021 | Wu ..................... G06F 16/3329 |

FOREIGN PATENT DOCUMENTS

| CN | 109986569 | 7/2019 |
| JP | 2019-036966 | 3/2019 |
| JP | 6670916 | 3/2020 |
| WO | WO 2020/040320 | 2/2020 |

OTHER PUBLICATIONS

Official Action for India Patent Application No. 202114021292, dated Mar. 8, 2022 7 pages.
(Continued)

*Primary Examiner* — Thjuan K Addy
(74) *Attorney, Agent, or Firm* — Sheridan Ross P.C.

(57) ABSTRACT

A contact center, communication system, and method of operating a contact center are provided. In one example, the contact center includes a tunable chatbot stored in memory and a chatbot tuning function that controls and adjusts a personality characteristic of the tunable chatbot while the tunable chatbot is interacting with a customer via a customer communication device.

20 Claims, 12 Drawing Sheets

(56) References Cited

OTHER PUBLICATIONS

Notice of Allowance for U.S. Appl. No. 17/107,118, dated Feb. 24, 2022 5 pages.
Official Action for U.S. Appl. No. 17/107,118, dated Oct. 1, 2021 10 pages.
Official Action with machine translation for Japan Patent Application No. 2021/082927, dated Aug. 18, 2022 10 pages.

* cited by examiner

TUNABLE CHATBOTS

CROSS-REFERENCE TO RELATED APPLICATIONS

The present application claims the benefit under 35 U.S.C. § 119(e) of U.S. Provisional Application Ser. No. 63/026,561, filed May 18, 2020, entitled "TUNABLE CHATBOTS", which is hereby incorporated herein by reference in its entirety.

FIELD

Embodiments of the present disclosure relate generally to communication methods and specifically to communication methods performed using automated communication resources.

BACKGROUND

A chatbot is a tool used to conduct real-time or near-real-time conversations via text or text-to-speech and speech-to-text. Chatbots are typically used in dialog systems or contact centers for purposes of providing customer service, request routing, and/or information gathering. The benefit to employing chatbots is that more expensive human agents can be reserved for less routine customer interactions.

BRIEF SUMMARY

An improved contact center is proposed to include an "agent", which may be an automated agent or chatbot in a contact center. The contact center may be operated by an entity while the automated agent or chatbot may be provided by a third party other than the operator of the contact center. Furthermore, a contact center may have more than one supplier of automated agents or chatbots. In other words, a contact center is configured to utilize multiple different automated agents or chatbots from a number of different entities. In some embodiments, more than one "model/version" of an automated agent or chatbot may be available to the contact center operator. The contact center operator may want to decide when to use one version/model/supplier of an automated agent or chatbot vs. another version/model/supplier. Situational context, customer preferences, contact type, contact purpose, contact center state, and other contextual factors may be used by the contact center to determine which automated agent or chatbot to assign to a particular contact and/or deploy for a period of time.

When matching a caller with live agents, it's assumed that the agent's characteristics are generally set. Human agents can be coached to be more friendly, more succinct, more authoritarian-but the effectiveness of real-time coaching can be limited. In comparison, an automated agent or chatbot could expose a set of controls or "dials" where the level of different attributes could be specified in real-time to shape the characteristics of the automated agent for a given call, where a "call" should be understood to describe a voice-based interaction, a video-based interaction, and/or a text-based interaction between the person interacting and the agent. The adjustment of automated agent or chatbot attributes may be selected based on AI modeling by the contact center of what agent characteristic(s) are predicted to yield the best results (e.g., achieve an outcome that satisfies a particular optimization function).

One aspect of the present disclosure is to enable a contact center to monitor a customer's interaction experience in real-time with an automated agent or chatbot and, also in real-time, modify the automated agent or chatbot's properties/characteristics to improve the customer interaction.

Another aspect of the present disclosure enables the contact center to test automated agents or chatbots for a relationship between "dial settings" for characteristics and results observed by monitoring live interactions. The observations of an automated agent or chatbot's performance may result in defining certain parameters and settings with different agent personalities. For instance, an automated agent or chatbot may be assigned a 'friendly' setting at a first dial setting of 0.5 out of 0.0-1.0. As another example, a second dial setting may be used to adjust the automated agent or chatbot's empathy and the appropriate second dial setting to achieve the desired empathy may be a setting of something different than 0.5 and may also require a different value for the first dial setting.

Another aspect of the present disclosure is to provide a list of possible agent characteristics by an AI-agent provider (e.g., a provider and trainer of automated agents or chatbots), which may not necessarily be the same as other AI-agent providers. The difference in AI-agent provider's agent characteristics may be present by virtue of the AI-agent provider using different training data and/or different feedback responses to train their automated agents or chatbots as compared to other AI-agent providers. The differences between automated agents or chatbots from different AI-agent providers, while subtle, may provide the contact center with a variety of options for assigning different automated agents or chatbots to different interactions depending upon the desired outcome and the status of the interaction. Here, the contact center may use AI-based analysis to correlate the sensitivity of different AI-agents provided by different providers to create a more uniform view of the different AI-agents available from the different AI-agent providers. It should be appreciated that multiple teams (e.g., multiple different AI-agent providers) may work within a company (e.g., entity operating the contact center) to provide multiple automated agents or chatbots to the production system being implemented by the contact center. It would also be possible to configure the automated agents or chatbots to test one another from one team to another team or from within the same team.

Another aspect of the present disclosure is to enable a contact center to select particular automated agents or chatbots for use in particular interactions or for different conditions. The contact center may experience a different cost for operating different automated agents or chatbots from different AI-agent providers. This cost of operating information may be considered by the contact center when deciding which particular automated agent or chatbot should be assigned to a particular customer or interaction. It should be appreciated that the contact center may perform a cost-benefit analysis as part of deciding which automated agent or chatbot to assign to an interaction, which means that the best automated agent or chatbot may not always be selected if that also corresponds to the most expensive automated agent or chatbot and the likelihood of customer satisfaction is relatively high with use of a less expensive automated agent or chatbot. Said another way, the contact center may be allowed to perform the cost-benefit analysis as part of a contact routing process. In some embodiments, the contact center may consider whether an automated agent or chatbot corresponds to an in-house our outsourced resource. Automated agents or chatbots that are developed in-house may correspond to a more cost-effective option as compared to an outsourced automated agent or chatbot; however, an outsourced automated agent or chatbot may be better suited to handle a particular type of question raised or attitude shown by a contact.

The characteristics of an automated agent or chatbot are often thought of as deterministic. However, it is possible instead to create automated agents or chatbots with a range of a characteristic as a probability curve (e.g., a bell curve around a median value/median experience). Another aspect of the present disclosure is for the contact center to specify the width of the bell curve (e.g., wide vs. 'tightly controlled' experience). Another aspect is for the contact center to externally characterize the distribution of the characteristic(s) (e.g., the shape and median of the curve) in order to create a unique experience for the customer as well as to account for uncertainty in the contact center's characterization of the caller.

Another aspect of the present disclosure is to enable the contact center to pre-test contact center agents (e.g., automated agents or chatbots) immediately before selecting an agent for connecting to a live customer. With this capability, the contact center could exercise automated agents or chatbots prior to releasing the live customer to the automated agent or chatbot. Because the pre-test can be performed relatively quickly, the customer will not likely experience any significant delays in service or connection to the selected agent. Some reasons to utilize pre-testing would be to check the characteristics of the agent, to validate that recent optimizations or software updates have kept the agent acceptable, etc. If it seems wasteful or unacceptable to use one automated agent to test another automated agent or chatbot, it should be appreciated that there are possible contractual reasons to have third parties perform the automated agent or chatbot testing (e.g., revenue sharing, assuming liability, volume pricing, etc.)

In some embodiments, testing could be done faster than real-time (e.g., at "Hyperspeed"). Hyperspeed testing would be where the speech (or text chat) from the 'customer' could be delivered as a file or at a negotiated real-time rate that was higher than normal speech (e.g., 100× or 10 ms per live second). Delivering the content to the automated agent or chatbot in this way may enable hyperspeed testing to be performed without the customer ever realizing such testing was in progress during an interaction.

In some embodiments, AI-agent provider could be advised that a particular call is a test call (so don't include in training set), or could not be advised, so that contact center could shape or weight the supplier's view of distribution of caller characteristics. As an example, the contact center may plan to move more upsell customers to a particular type of automated agent or chatbot, and so pre-loads/trains the AI-agent provider with a mix of fake and real customer interactions.

Pretesting could be made faster for distribution processing by using quantum computing to create fake customer interactions, while quantum computing could be used by the automated agent or chatbot to more quickly provide automated agent or chatbot responses. A combination of quantum computing-powered pretest engagements with quantum computing customers and quantum computing agents could very quickly characterize the automated agent or chatbot by the contact center, or train the agent by the provider.

As used herein, automation of a contact center may refer to a behavior of the contact center whereby interactions are managed by an automated agent or chatbot, which may use directed dialog based on rules (e.g., expert systems) or Artificial Intelligence (AI).

It should be appreciated that conversations or interactions can be between one or multiple customers and one or multiple agents (e.g., one or multiple automated agents or chatbots and/or one or multiple human agents). In some embodiments, a digital communication channel may be used to facilitate the conversation or interaction. Non-limiting examples of digital communication channels include a communication modality that is configured to enable digital message communications between a customer's communication device (e.g., a client device, a mobile communication device, a smart phone, a tablet, a PC, a laptop, etc.) and an agent's communication device (e.g., a client device, a mobile communication device, a smart phone, a tablet, a PC, a laptop, a server executing a chatbot, etc.). In some embodiments, the digital communication channel may include or utilize one, some, or many different communication pathways, protocols, or messaging services. Non-limiting examples of messaging services that may be supported by a digital communication channel include direct digital messaging (e.g., direct chat, SMS text, email, etc.), social media messaging (e.g., social media posts, social media direct messaging, etc.), webchats, or any other communication protocol that enables conversations to occur and be memorialized in non-real-time or near-real-time. It should be appreciated that live voice or video conversations may also be facilitated with automated agents or chatbots without departing from the scope of the present disclosure.

Specific, but non-limiting examples of digital communication channels include: (1) "Over-the-Top" (OTT) channels, including. Facebook Messenger, Twitter DM, WeChat, WhatsApp, Apple Business Chat, LINE, KakaoTalk; (2) "Telco" channels, including: SMS and Google RCS; (3) outbound, App-to-Person ("A2P") messages, that are used by enterprise customers to facilitate various enterprise-specific communications (e.g., notifications, alerts, promotions, etc.); and/or (4) "Real Time Messaging" (RTM) channels, including: In-App messaging (Android, iOS and W/eb), Push messaging (Android, iOS and Browser Notifications), etc.

According to some embodiments, automated components of a contact center (e.g., a chatbot engine) may have access to a set of "trained" intents that represent possible topics that a user would engage in with the contact center. Thus, it should be appreciated that different intents may be trained for different conditions as some conditions may support conversations on some topics that other conditions may not support. The training of the intents and construction of the chatbot engine are services contemplated by embodiments of the present disclosure. There may be additional intents that represent certain classes of response that are more generic including yes/no type confirmation intents and others like "banter" that represent polite off topic user messages that need a response, but don't advance the state of the dialog. There may be dialog structural components that control the scope of the dialog with the user depending on the chatbot engine being used.

Interactions or conversations, as used herein, may correspond to two or more message exchanges between two or more entities over a communication channel (e.g., a digital communication channel, a voice communication channel, a video communication channel, or combinations thereof). In some embodiments, an interaction may correspond to a question and response message pair, a question and question message pair, a statement and response message pair, or a set of messages.

As used herein, a conversation model may correspond to a data set that is useable in a neural network and that has been trained by one or more data sets that describe conversations or message exchanges between two or more entities. The conversation model may be stored as a model data file or any other data structure that is useable within a neural network or other style AI system.

It some embodiments, topics may eventually be uploaded into a Customer Relationship Management (CRM) system and/or customer journey application that is being executed within the contact center. The CRM system and/or customer journey application may be executed on a purpose-built server or may be executed by a server that is also implementing contact routing routines within the contact center.

In some embodiments, one or more machine learning models may be provided that encompass the likelihood of: abandon, abort, or requests for escalation to a supervisor. Such models may be used to train the neural networks utilized by the contact center or may be stored and used for comparison to current interactions to determine whether or not the current interaction has any similarities with the machine learning models. Alternatively or additionally, machine learning models may be utilized that can be used to measure "frustration", "friction", or "inertia." If an interaction is determined to have a particular amount of similarity with any such model, then action may be taken within the contact center to avoid further possible frustration, friction, or inertia (e.g., invoking a supervisor assistance function or transferring the contact to a different agent).

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or contact center is contemplated to include finite instruction sets and/or artificial intelligence-based models/neural networks to perform some or all of the steps described herein.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the illustrative aspects, embodiments, and/or configurations illustrated herein show the various components of the system collocated, certain components of the system can be located remotely, at distant portions of a distributed network, such as a Local Area Network (LAN) and/or the Internet, or within a dedicated system. Thus, it should be appreciated, that the components of the system can be combined in to one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Embodiments of the disclosure provide systems and methods for utilizing automated agents or chatbots (referred to herein after as "chatbots" for ease of discussion) to support interactions with human users/customers. A contact center may be provided with the ability to tune various chatbots in real-time to support desired outcomes in particular customer interactions. In some embodiments, the contact center may have access to multiple chatbots and may select a particular chatbot for assignment to an interaction based on known or tested characteristics of the chatbot as compared to other candidate chatbots that have different known or tested characteristics.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
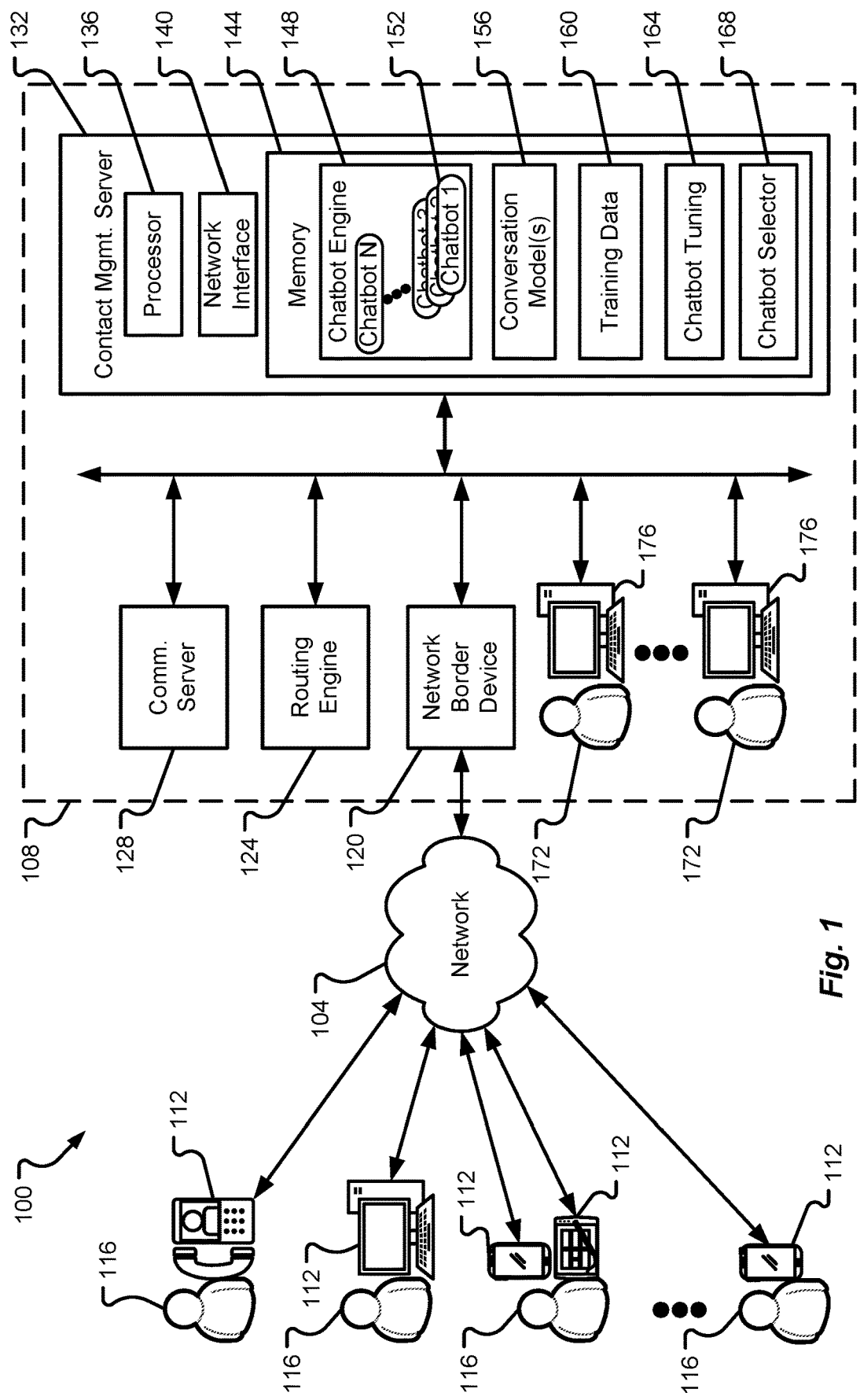
FIG. 1 is a block diagram illustrating a communication system in accordance with at least some embodiments of the present disclosure.

Referring initially to FIG. 1, a communication system 100 will be described in accordance with at least some embodiments of the present disclosure. The communication system 100 is shown to include a communication network 104 that interconnects a contact center 108 and resources thereof with multiple customer communication devices 112. As the name suggests, a customer communication device 112 may be owned and/or operated by a customer 116. The customer 116 may correspond to a user or person that interacts with their customer communication device 112 to communicate with a resource of the contact center 108. Specifically, the contact center 108 may include a number of resources that facilitate customer 116 interactions via one or multiple communication channels presented to and maintained for use by the customer 116 and one or more of their customer communication devices 112. As shown in FIG. 1, a customer 116 may utilize one or multiple customer communication devices 112 to interact with the contact center 108. Moreover, embodiments of the present disclosure contemplate that the customer 116 may use multiple different customer communication devices 112 to communicate via a single communication channel. As a non-limiting example, a customer 116 may login to a web-based portal or authenticate themselves with a particular chat channel and then utilize the web-based portal or chat channel to communicate with any one of their customer communication devices 112. As another example, a customer 116 may utilize one communication device 112 for voice communications, but utilize another communication device 112 for text-based communications.

A customer communication device 112 may correspond to a computing device, a personal communication device, a portable communication device, a laptop, a smartphone, a personal computer, and/or any other device capable of running an operating system, a web browser, or the like. For instance, a customer communication device 112 may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These customer communication devices 112 may also have any of a variety of applications, including for example, web browser applications, chat applications, social media applications, calling applications, etc. A customer communication device 112 may alternatively or additionally be any other electronic device, such as a thin-client computer, Internet-enabled mobile telephone, and/or personal digital assistant, capable of communicating via communication network 104 and/or displaying and navigating web pages or other types of electronic documents.

The communication network 104 can be any type of network familiar to those skilled in the art that can support data communications using any of a variety of commercially-available protocols, including without limitation SIP, TCP/IP, SNA, IPX, AppleTalk, and the like. Merely by way of example, the communication network 104 may correspond to a LAN, such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the IEEE 802.11 suite of protocols, the Bluetooth® protocol known in the art, and/or any other wireless protocol); and/or any combination of these and/or other networks.

The contact center 108 is shown to include one or more computing devices that enable a contact center agent 172 and/or chatbot 152 to interact with a customer 116 via a communication channel established between the customer communication device 112 and the contact center 108. In particular, the contact center 108 is shown to include a network border device 120 and a number of servers 124, 128, 132 that enable functionality of the contact center 108. The network border device 120 may correspond to one or a number of devices that establish and maintain information security for the contact center 108. The network border device 120, in some embodiments, may include a Session Border Controller (SBC), a firewall, a Network Address Translator (NAT) device, a protocol converter, or combinations thereof. Because the communication network 104 may be untrusted from the perspective of an operator of the contact center 108, the network border device 120, in some embodiments, may be configured to implement security policies or rules. When communications, messages, packets, or the like are received at the network border device 120, components of the network border device 120 may analyze the received communications, messages, packets, etc. to determine if the contents of the received communications, messages, packets, etc. can be safely passed to other components of the contact center 108. In some embodiments, all contents that safely pass through the network border device 120 may be transferred to the communication server 128 or routing engine 124 for further analysis and processing (e.g., for inclusion with a particular conversation, for assigning/forwarding to a particular contact center agent 172, for assigning/forwarding to a particular chatbot 152, etc.).

In some embodiments, each server of the contact center 108 may be configured to perform a particular task or a set of tasks specific to supporting functions of the contact center 108. For instance, the routing engine 124 may correspond to a server or set of servers that are configured to receive messages from the network border device 120 and make routing decisions for the message(s) within the contact center 108. The communication server 128 may correspond to a single server or a set of servers that are configured to establish and maintain a communication channel between customers 116 and the contact center 108. In some embodiments, the routing engine 124 and communication server 128 may work in cooperation to ensure that an appropriate agent 172, chatbot 152, set of agents 172, and/or set of chatbots 152 are assigned to a particular communication channel for purposes of servicing/addressing contacts initiated by customers 116 of the contact center 108. Specifically, but without limitation, the routing engine 124 may be configured to determine which agent 172 or chatbot 152 should be assigned to a particular communication channel for purposes of answering a customer's 116 question and/or for purposes of providing a service to the customer 116. As will be discussed in further detail herein, the routing engine 124 may receive inputs from the contact management server 132 that include information describing a selected chatbot 152 for assigning to a customer 116 contact.

The routing engine 124 may provide appropriate signaling to an agent's communication device 176 that enables the agent's communication device 176 to connect with the communication channel over which the customer 116 is communicating and to enable the agent 172 to view messages sent by the customer's communication device 112, which are eventually assigned to and posted on the appropriate communication channel. As a more specific example, the communication server 128 may establish and maintain a digital chat communication channel that is presented to the customer's communication device 112 and which enables the customer 116 to send chat messages to the contact center 108 when desired. When messages are received from a customer communication device 112 and assigned to a particular chat communication channel, the routing engine 124 may determine which agent 172 or chatbot 152 will service the customer's 116 needs (e.g., answer a question, provide a service, etc.) and then connect the selected agent's communication device 176 and/or chatbot 152 to the same chat communication channel, thereby enabling the agent 172 and/or chatbot 152 to engage in a chat session with the customer 116. Alternatively or additionally, as will be described in further detail herein, the routing engine 124 may perform a cost-benefit analysis as part of making a routing decision with respect to a chatbot 152. For example, the routing engine 124 may be configured to consider a cost associated with using a particular chatbot 152 for servicing a customer 116 and weigh that cost against the potential benefit associated with successfully completing the interaction with the customer 116 (e.g., a sales or revenue benefit, a customer satisfaction rating, etc.).

It should be appreciated that the routing engine 124 may be configured to connect both a human agent 172 and one or multiple chatbots 152 to the communication channel if it is desirable to allow the automated agent respond to the customer's 116 messages in a semi-automated fashion (e.g., where the chatbot 152 generates a suggested reply to a message, but a human agent 172 is required to approve or edit the message prior to being transmitted/committed to the communication channel and delivered to the customer communication device 112).

Although described as a chat server, it should be appreciated that the communication server 128 may be configured to support any number of communication protocols or applications whether synchronous or asynchronous. Non-limiting examples of communication protocols or applications that may be supported by the communication server 128 include the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging (WAMP), SOAP, MIME, Real-Time Messaging Protocol (RTP), Web Real-Time Communications (WebRTC), WebGL, XMPP, Skype protocol, AIM, Microsoft Notification Protocol, email, etc. In addition to supporting text-based communications, the communication server 128 may also be configured to support non-text-based communications such as voice communications, video communications, and the like.

Another server or set of servers that may be provided in the contact center 108 is a contact management server 132. The contact management server 132 may be configured to manage the contacts or work items that exist within the contact center 108 and that represent tasks to be performed by a human agent 172 and/or chatbot 152 in connection with providing a service to a customer 116. The contact management server 132 may be configured to maintain state information for some or all of the contacts in the contact center 108 at any given point in time. The contact management server 132 may also be configured to manage and analyze historical contacts as part of training and updating automated agents (e.g., one or multiple chatbots 152). In some embodiments, the contact management server 132 may maintain state information for human agents 172 in the contact center 108 and may further interact with the routing engine 124 to determine which agents 172 are currently available for servicing a contact and have the appropriate skills for servicing a contact. Likewise, the contact management server 132 may be configured to determine characteristics associated with various different chatbots 152 provided by a chatbot engine 148 and select one chatbot 152 from the plurality of chatbots 152 for assigning to a contact. Again, the assignment decision may be a skill-based assignment decision. Additional capabilities of the contact management server 132 will be described in further detail with respect to operation of a chatbot engine 148 the chatbot tuning 164 and chatbot selector 168, which are both shown to be provided by the contact management server 132.

While certain components are depicted as being included in the contact management server 132, it should be appreciated that such components may be provided in any other server or set of servers in the contact center 108. For instance, components of the contact management server 132 may be provided in a routing engine 124 and/or communication server 128, or vice versa. Further still, embodiments of the present disclosure contemplate a single server that is provided with all capabilities of the routing engine 124, the communication server 128, and the contact management server 132.

The contact management server 132 is shown to include a processor 136, a network interface 140, and memory 144. The processor 136 may correspond to one or many computer processing devices. Non-limiting examples of a processor include a microprocessor, an Integrated Circuit (IC) chip, a General Processing Unit (GPU), a Central Processing Unit (CPU), or the like. Examples of the processor 136 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM®

Cortex-A and ARM926EJ-S™ processors, other industry-equivalent processors, and may perform computational functions using any known or future-developed standard, instruction set, libraries, and/or architecture.

The network interface 140 may be configured to enable the contact management server 132 to communicate with other machines in the contact center 108 and/or to communicate with other machines connected with the communication network 104. The network interface 140 may include, without limitation, a modem, a network card (wireless or wired), an infra-red communication device, etc.

The memory 144 may include one or multiple computer memory devices. The memory 144 may be configured to store program instructions that are executable by the processor 136 and that ultimately provide functionality of the communication management server 132 described herein. The memory 144 may also be configured to store data or information that is useable or capable of being called by the instructions stored in memory 144. One example of data that may be stored in memory 144 for use by components thereof is training data 160.

The memory 144 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 144, in some embodiments, corresponds to a computer-readable storage media and while the memory 144 is depicted as being internal to the contact management server 132, it should be appreciated that the memory 144 may correspond to a memory device, database, or appliance that is external to the contact management server 132.

Illustratively, the memory 144 is shown to store a chatbot engine 148, which includes a plurality of different chatbots 152. Each of the chatbots 152 may be configured for execution by the processor 136. In some embodiments, one or more chatbots 152 may correspond to a set of processor-executable instructions (e.g., a finite instruction set with defined inputs, variables, and outputs). In some embodiments, a chatbot 152 may correspond to an Artificial Intelligence (AI) component of the contact management server 132 that is executed by the processor 136. The chatbot engine 148, in some embodiments, may utilize one or more conversation models 156, which may be in the form of an artificial neural network, for recognizing and responding to messages transmitted by a customer 116 over a communication channel supported by the communication server 128. In some embodiments, each chatbot 152 of the chatbot engine 148 may be trained with training data 160 and may be programmed to learn from additional conversations as such conversations occur or after conversations occur. In some embodiments, the chatbot engine 148 may update one or more of the conversation models 156 as different chatbots 152 learn from ongoing conversations. In some embodiments, each chatbot 152 provided by the chatbot engine 148 may be configured to provide different attributes, characteristics, or skills. In other words, every chatbot 152 may be different from all other chatbots 152 and may be selected for assigning to a conversation based on the particular skills possessed by each chatbot 152.

In some embodiments, chatbots 152 may be trained or tuned to have a particular characteristic or skill (e.g., friendly, supportive, assertive, knowledgeable for a particular technology, using technical jargon, using layman's terms, etc.). Chatbots 152 and their characteristics may be tuned using a chatbot tuning 164 function. The chatbot tuning 164 may be adjustable by an operator of the contact center 108 or may be automatically adjusted based on certain contact center 108 conditions (e.g., call volume, customer level, etc.). In addition to providing chatbot 152 tuning capabilities, a chatbot selector 168 may also be provided to select one chatbot 152 from the plurality of chatbots 152 for assigning to a particular customer, to a particular interaction, or the like. Enabling a chatbot tuning 164 and chatbot selector 168 to work simultaneously may enable the contact center 108 to specifically tune a particular, selected, chatbot 152 for a particular customer or skill requirement. That is, a specific chatbot 152 may be selected for assigning to a customer 116 and then the chatbot tuning 164 may be used to appropriately tune the selected chatbot 152 prior to enabling the chatbot 152 to engage in the interaction with the customer 116.

Figure 2:
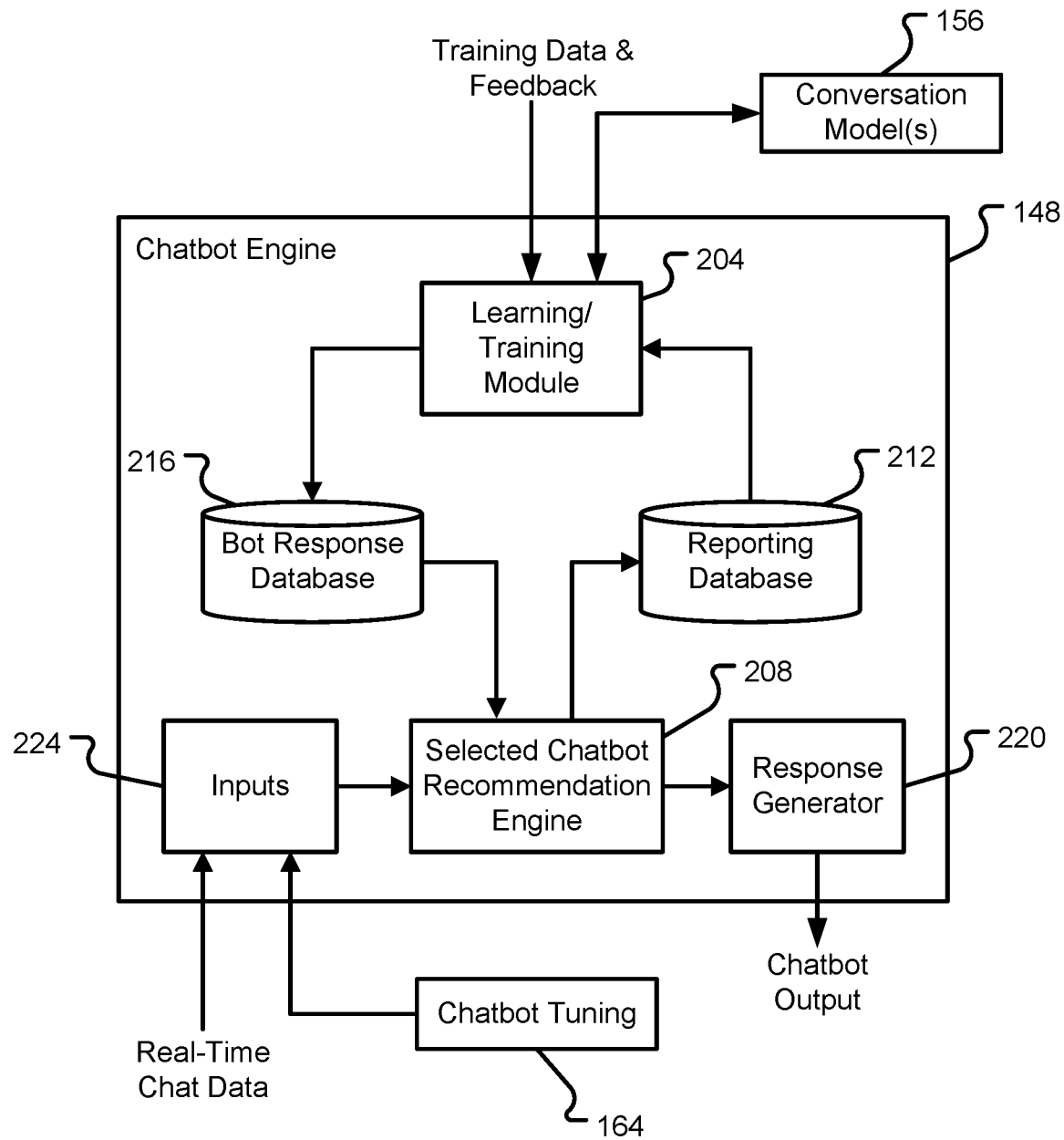
FIG. 2 is a block diagram depicting additional details of a chatbot engine in accordance with at least some embodiments of the present disclosure.

As mentioned above, the chatbot engine 148 and the chatbots 152 provided thereby may be configured to operate using a set of guidelines (e.g., as a set of static instructions) or by using machine learning. Further details of a chatbot engine 148 utilizing machine learning will now be described with reference to FIG. 2. Again, the chatbot engine 148 utilizing machine learning may have access to training data 160 to initially train behaviors of the chatbots 152. The chatbot engine 148 may also be configured to learn from further conversations based on feedback, which may be provided in an automated fashion (e.g., via a recursive learning neural network) and/or a human-provided fashion (e.g., by a human agent 172 confirming or denying that a particular response prepared by the chatbot 152 was appropriate for a particular message received from a customer 116).

A learning/training module 204 of the chatbot engine 148 may have access to and use one or more conversation models 156. The conversation models 156 may be built and updated by the training/learning module 204 based on the training data and feedback. The learning/training module 204 may also be configured to access information from a reporting database 212 for purposes of building a bot response database 216, which effectively stores bot responses that have been previously provided by the chatbot engine 148 and have been identified as valid or appropriate under the circumstances (e.g., based on a positive response from a customer 116 and/or based on administrative user inputs). In some embodiments, each individual chatbot 152 may have its own bot response database 216 and may be trained with its own unique training data 160. Responses within the bot response database 216 may constantly be updated, revised, edited, or deleted by the learning/training module 204 as a selected chatbot 152 engages in more conversations with customers 116.

In some embodiments, the chatbot engine 148 may include a recommendation engine 208 for each selected chatbot 152 that has access to the bot response database 216 and selects appropriate response recommendations from the bot response database 216 based on dialog inputs 224. Inputs 224 may include real-time chat data, voice data, video data, as well as outputs of the chatbot tuning 164. The chatbot tuning 164 may be used to specifically tune or adjust characteristics of a selected chatbot 152.

The real-time chat data may correspond to the content of a message received on a communication channel from a customer's communication device 112. Using the inputs 224 and the bot response database 216, the selected chatbot recommendation engine 208 may be configured to recommend one or multiple responses to a response generator 220. The response generator 220 may be configured to provide a selected response as a chatbot output for sending on the appropriate communication channel. The interactions between the chatbot engine 148 (and the selected chatbot 152 operating therein) and customer 116 may represent a contact within the contact center 108 and the status of the contact may be determined by agent monitoring functionality, which updates the conversation state accordingly. In some embodiments, the chatbot engine 148 may be configured to interact with a customer 116 in such a way that the customer 116 is unaware they are interacting with an automated agent, but rather think themselves to be interacting with a human agent 172.

To achieve this capability, the chatbot engine 148 and each of the chatbots 152 provided therein may constantly be provided training data from conversations between human agents 172 and customers 116 that have occurred over a particular communication channel. It may be possible to train a chatbot 152 to have a particular skill (e.g., by training the chatbot 152 with conversations related to a particular topic such as sales, product troubleshooting, billing, reservation assistance, etc.). Accordingly, it should be appreciated that the contact center 108 may include a plurality of chatbots 152 of different types without departing from the scope of the present disclosure and each of the chatbots 152 may be selected by the chatbot selector 168 for assigning to a particular customer 116 and interaction.

Figure 3:
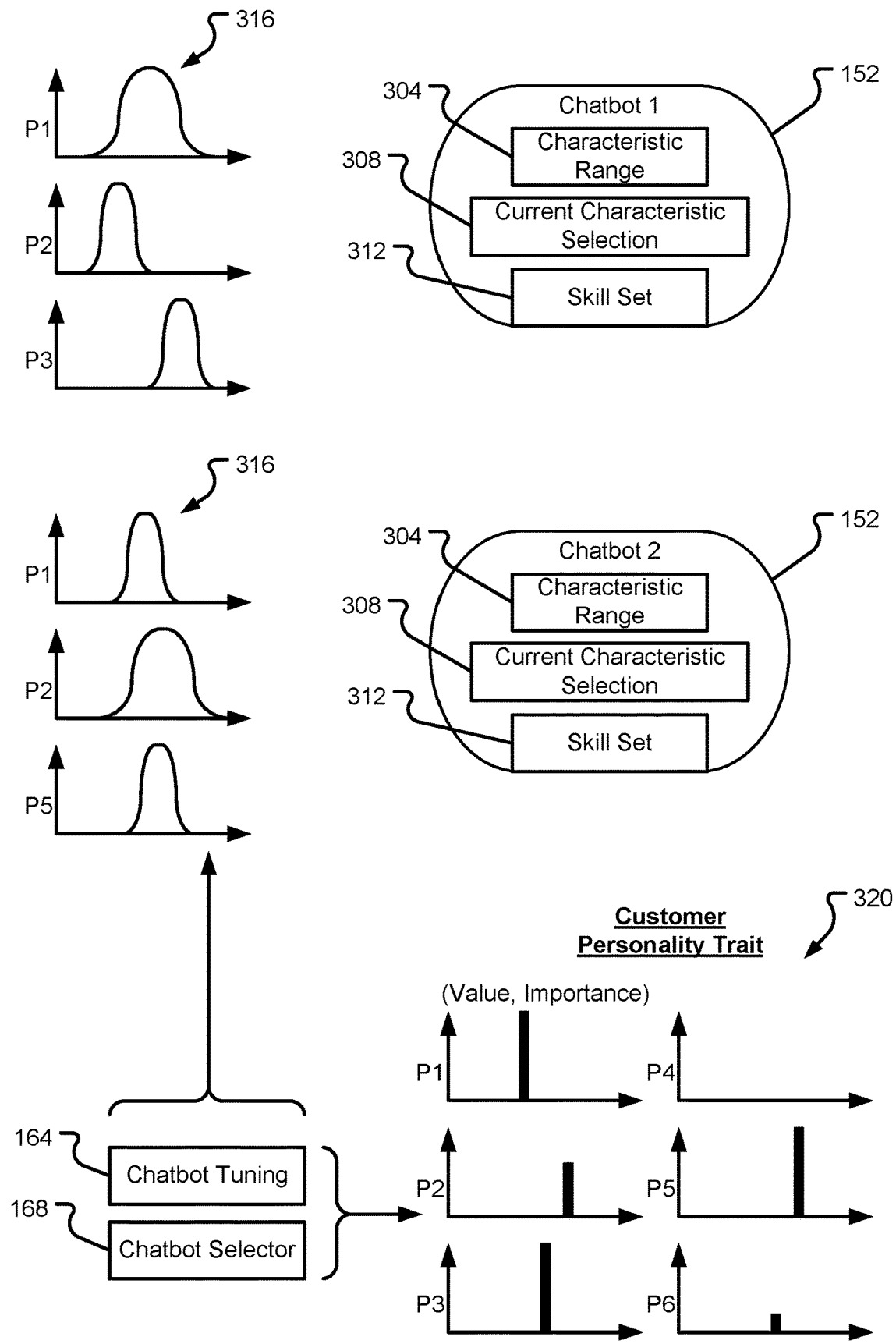
FIG. 3. Illustrates a number of chatbots and their associated characteristic ranges in accordance with at least some embodiments of the present disclosure.
Figure 4:
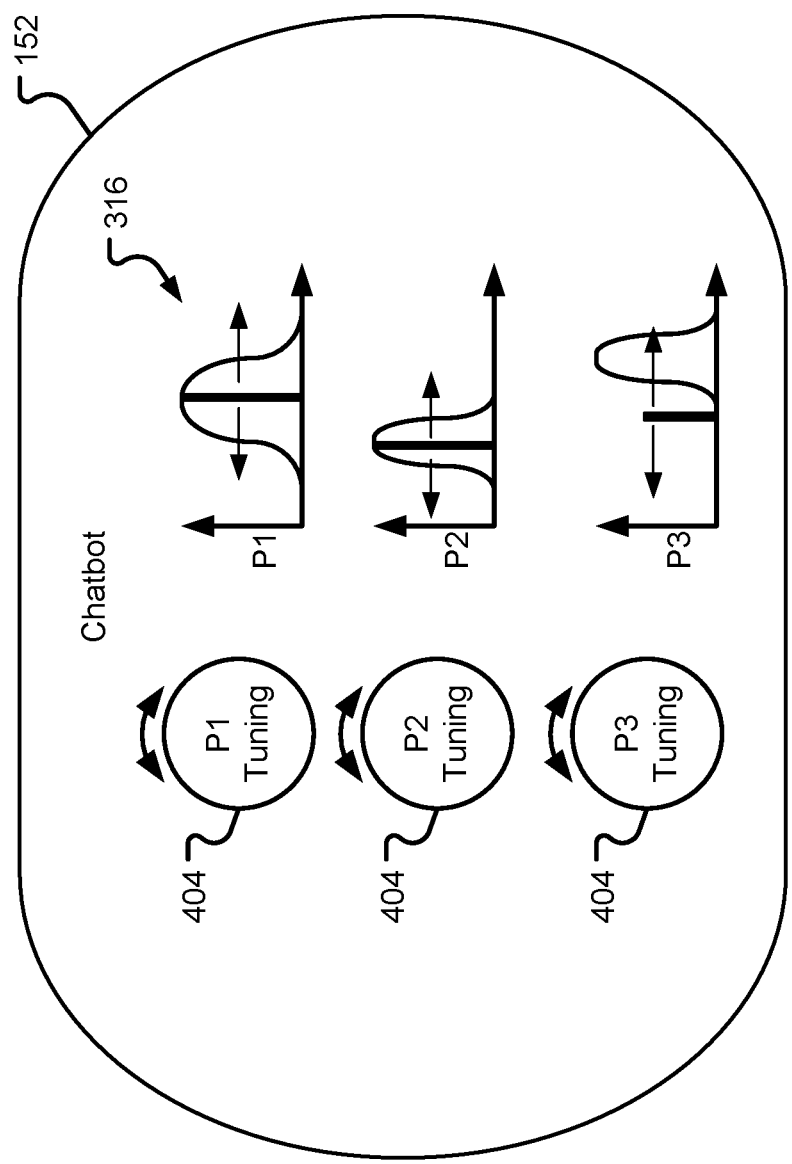
FIG. 4 illustrates a tunable chatbot in accordance with at least some embodiments of the present disclosure.
Figure 5:
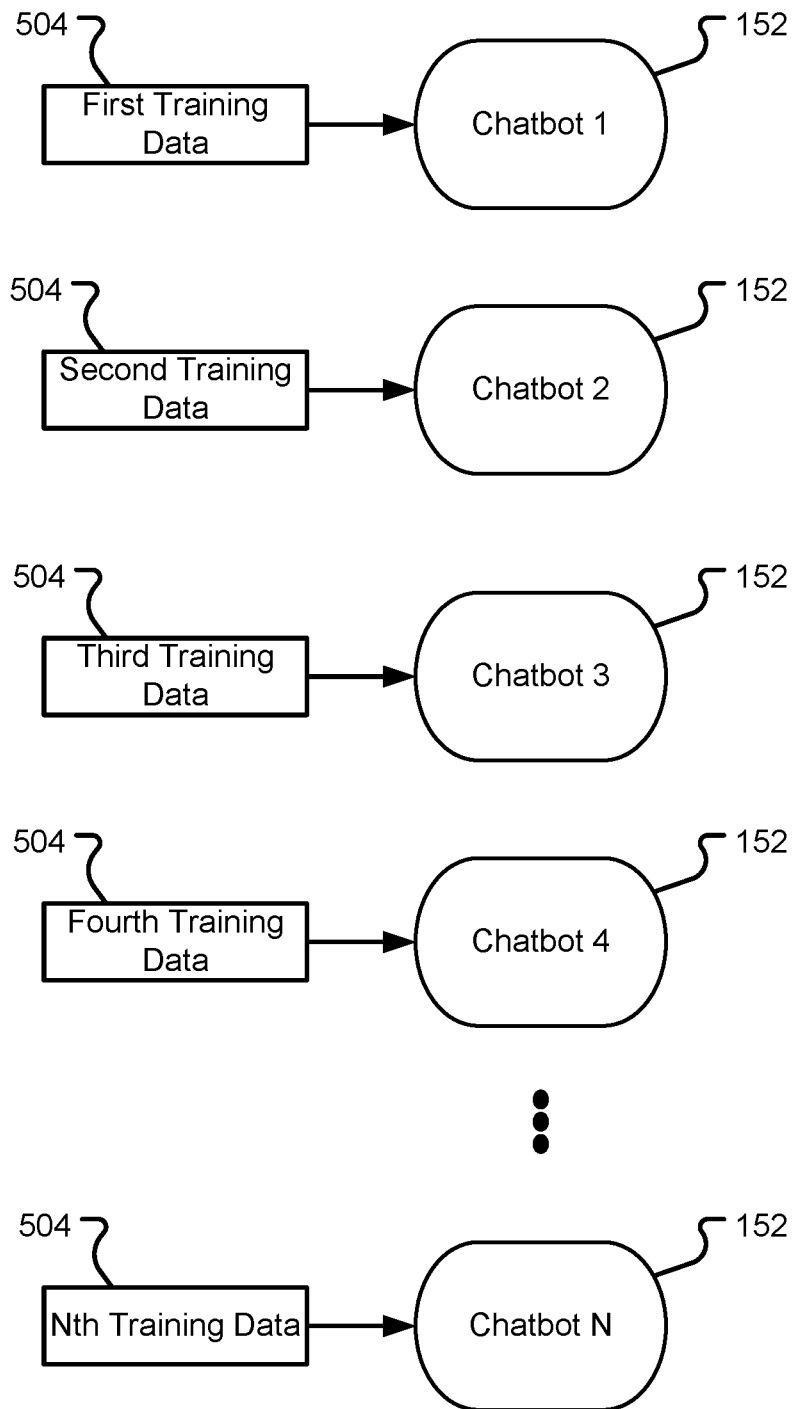
FIG. 5 illustrates a number of different chatbots trained with different training data in accordance with at least some embodiments of the present disclosure.

With reference now to FIGS. 3-6, various capabilities and further functionality of chatbots 152 will be described in accordance with at least some embodiments of the present disclosure. In some embodiments, a chatbot 152 may include a characteristic range 304 and a defined skill set 312. When a chatbot 152 is selected and assigned to a customer interaction by the chatbot selector 168, the chatbot tuning 164 may tune the selected chatbot 152 to a current characteristic selection 308. The current characteristic selection 308 may correspond to a particular characteristic setting that is within the chatbot's 152 characteristic range 304. In some embodiments, the characteristic range 304 and/or skill set 312 for each chatbot 152 may be created by training the chatbot 152 with different training data 504. As shown in FIG. 5, each chatbot 152 provided by the chatbot engine 148 may be trained with different training data 504, thereby enabling each chatbot 148 to exhibit different characteristic ranges 304.

In some embodiments, the chatbot selector 168 may select a particular chatbot 152 for assignment to a customer 116 based on a perceived personality trait 320 that will match or satisfy a customer's 116 communication preferences. In some embodiments, the chatbot tuning 164 may further tune 404 different personality characteristics 316 of a selected chatbot 152 in an attempt to meet the customer's 116 desired personality trait 320. Specifically, the chatbot selector 168 may be configured to determine a customer personality trait 320 that is more likely than not to be found desirable by the customer 116 that initiated the contact. The identified personality traits P1, P2, P3, . . . , etc. may be determined to have a particular value (e.g., a trait of polite may have a value of very polite, mildly polite, impolite, etc.) and a corresponding importance (e.g., very important, somewhat important, not important) for the personality trait. In the chart of FIG. 3, the position of each bar on a personality trait chart may represent the particular value of the personality trait whereas the magnitude/size of the bar represents the corresponding importance for the personality trait.

As shown in FIGS. 3 and 4, each personality characteristic 316 available to be provided by a chatbot 152 may be tunable 404 within the characteristic range 304. In some embodiments, the characteristic range 304 of a chatbot 152 may first be established by training the chatbot 152 and then the characteristic range 304 may move or adjust over time as the chatbot 152 is further trained and updated while in use (e.g., based on training feedback). The characteristic range 304 of a chatbot 152 may be represented by a probability curve having a corresponding mean, median, standard deviation, width, etc. The ability of a chatbot 152 to provide a particular personality characteristic 316 may not be exact and, therefore, is better represented as a probability curve. In some embodiments, a width of the probability curve may represent a chatbot's 152 ability to provide a particular personality characteristic with a determined degree of confidence. For instance, the first chatbot 152 of FIG. 3 is shown to have a relatively wide probability curve for the first personality characteristic 316, but a narrower probability curve for the second personality characteristic 316. This means that the first chatbot 152 is more likely to be able to provide the mean/average value of the second personality characteristic 316 than the mean/average value of the first personality characteristic 316. A narrower probability curve for any personality characteristic 316 may also reflect that the chatbot 152 is not likely to be tunable 404 for that particular personality characteristic 316. In other words, a wider probability curve for a personality characteristic 316 may suggest that the chatbot 152 can have that particular personality characteristic 316 tuned by the chatbot tuning 316 more than some other personality characteristic 316 with a narrower probability curve.

All of the parameters of a probability curve for each personality characteristic 316 may effectively represent the chatbot's 152 characteristic range 304. Moreover, if a chatbot 152 has a large number of different personality characteristics 316 and each personality characteristic 316 has a corresponding characteristic range 304 with a wide probability curve, then the chatbot 152 may be considered a relatively flexible chatbot 152, but the chatbot 152 may not necessarily provide any particular personality characteristic 316 with a high degree of confidence. On the other hand, a chatbot 152 having one or two particular personality characteristics 316 with a relatively narrow probability curve for the personality characteristics 316 may be more likely to provide the personality characteristic 316 during an interaction with a high degree of confidence.

In some embodiments, a personality characteristic 316 of a chatbot 152 may be matched to one or more personality traits 320 desired by a customer 116 and chatbots 152 may be selected by the chatbot selector 168 on this basis. Using the non-limiting example of FIG. 3, a customer 116 may be found to have six personality traits 320 that are found desirable with corresponding values and importance levels. Based on the magnitude of the bars, personality traits P1, P3, and P5 are identified as the most important personality traits 320 for the customer 116 and the position of each bar represents the value of the personality traits 320. The chatbot selector 168 may refer to personality characteristics of all chatbots 152 available for an interaction with the customer 116 and the personality characteristics 316 of each chatbot 152 to determine which chatbot 152 will be most likely to interact with the customer 116 in a satisfactory manner. Based on the importance of personality traits 320 identified for the customer 116, the chatbot selector 168 will look for chatbots 152 capable of providing the desired personality trait 320 by analyzing the personality characteristics 316 for the chatbots 152. A chatbot 152 not likely to provide a personality characteristic of P1, P3, and P5 will not likely be chosen for the customer interaction if another chatbot 152 that is likely to provide one or more of the personality characteristics P1, P3, and P5 is available. In the example of FIG. 3, the first chatbot 152 does not have the personality characteristic 316 for the fifth personality trait P5 whereas the second chatbot 152 does not have the personality characteristic 316 for the third personality trait P3. However, the second chatbot 152 does have the ability (as represented by the characteristic range 304) to provide the first personality trait P1 and fifth personality trait P5 with a high degree of confidence (because of the narrow probability curve for those personality traits) whereas the first chatbot 152 does not have as narrow a probability curve for the first personality trait P1. This means that the chatbot selector 168 may select the second chatbot 152 for interacting with the customer 116 rather than the first chatbot 152 since the second chatbot 152 can more likely provide the desired personality characteristics 316 that satisfy the first and fifth personality traits, which are identified as important to the customer 116.

As the customer 116 interacts with the selected chatbot 152, the chatbot tuning 164 may analyze the customer's 116 reactions to the outputs provided by the chatbot 152 to determine if the interaction is progressing positively (e.g., moving from one state to the next toward resolution), negatively (e.g., the customer 116 is exhibiting frustration), or stalled (e.g., the interaction is not moving from one state to the next toward resolution). If the chatbot tuning 164 detects that the interaction is progressing negatively or stalled, then the chatbot tuning 164 may attempt to tune 404 one or more of the personality characteristics 316 of the selected chatbot 152. As mentioned above, a chatbot 152 having a wider probability curve for a particular personality characteristic 316 may be more flexibly tuned to different values. On the other hand, a chatbot 152 having a narrower probability curve for a particular personality characteristic 316 may not be as flexibly tuned to provide different values. As shown in FIG. 4, certain chatbots 152 may not be capable of having their personality characteristics 316 tuned to provide a certain value of a personality trait 320 (e.g., the third personality trait P3 at the desired value).

In some embodiments, each personality characteristic 316 may match a particular personality trait 320 desired by a customer 116. A personality characteristic 316 of a chatbot 152 may meet the customer's 116 personality trait 320 in some instances where the probability curve of the corresponding personality characteristic 316 overlaps with the value defined for the customer's desired personality trait 320. A personality characteristic 316 (or personality trait 320 if viewed from the perspective of the customer's 116 preference) may correspond to assertive, passive, quiet, permissive, conscientious, agreeable, extraverted, and/or introverted. Each personality trait 320 may have a corresponding personality characteristic 316 or may be mapped to a combination of different personality characteristics 316 provided by a chatbot 152.

Figure 6:
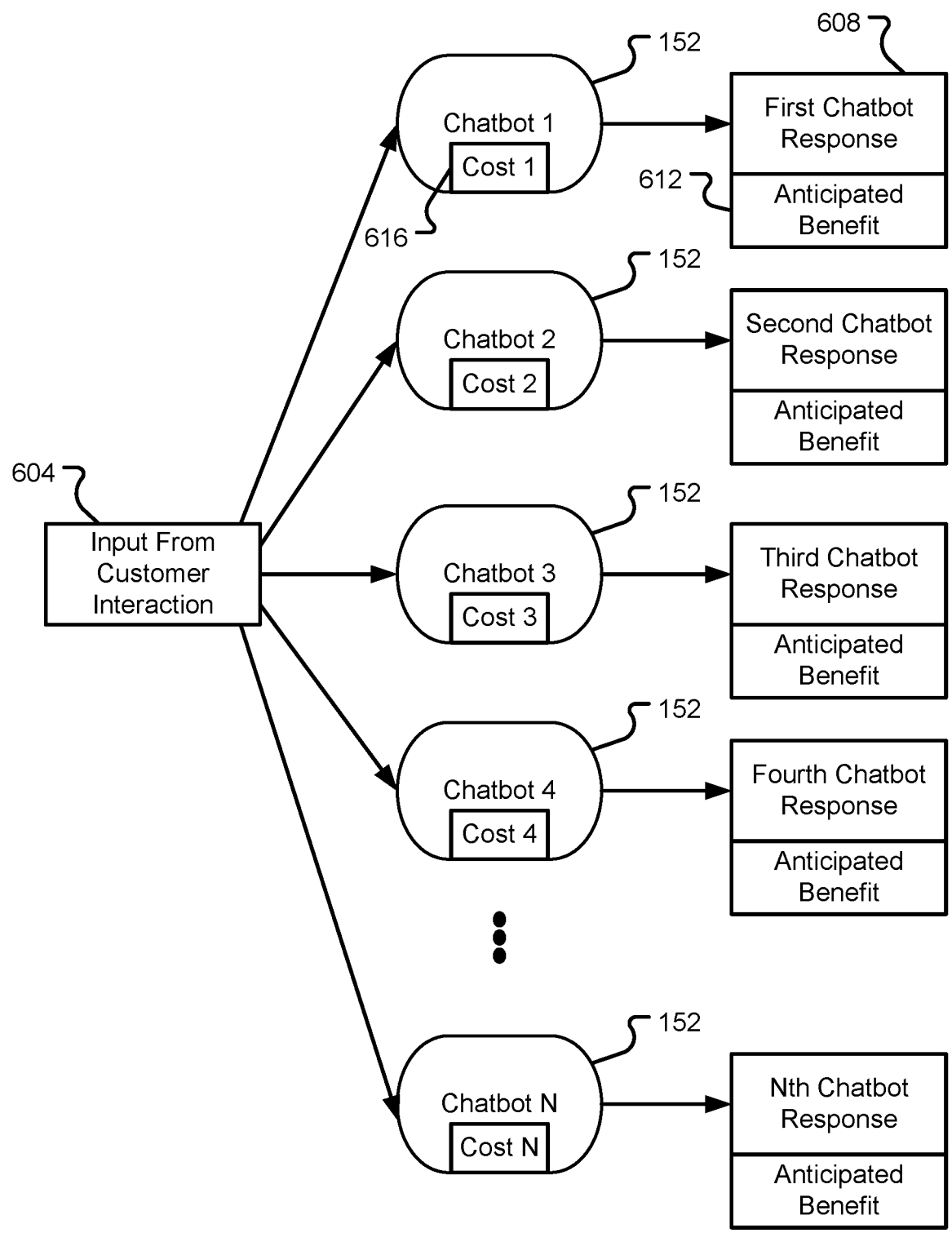
FIG. 6 illustrates a number of chatbots being pre-tested for selection in accordance with at least some embodiments of the present disclosure.

As shown in FIGS. 5 and 6, because each chatbot 152 may be trained with different training data 504, each chatbot 152 may be configured to provide different chatbot responses 608 to a common input from a customer interaction 604. With this information in mind, embodiments of the present disclosure contemplate the ability to test one or more chatbots 152 prior to assigning a chatbot 152 to a particular customer interaction. Specifically, the chatbot selector 168 may be configured to provide an initial input from a customer interaction 604 to a plurality of different chatbots 152. Each chatbot 152 may provide a candidate chatbot response 608, which has an anticipated benefit 612 associated therewith. The chatbot selector 168 may analyze the plurality of different chatbot responses 608, associated benefits 612 of the chatbot response 608, and a possible cost 616 of selecting a chatbot 152 for use in a customer interaction as part of selecting a chatbot 152. The input from the customer interaction 604 may correspond to a text, voice, or video input (depending upon the communication channel used by the customer 116 to contact the contact center 108). The candidate chatbot response 608 may be in text, voice, or video format as well.

The chatbot selector 608 may be configured to apply an optimization function when selecting one chatbot 152 from the plurality of chatbots for a customer interaction. The chatbot selector 168 may use the optimization function to balance the anticipated benefit 612 of one candidate chatbot response 608 against anticipated benefits 612 of other chatbot responses 608. In some embodiments, the chatbot selector 168 may select the chatbot 152 that provides a candidate chatbot response 608 with the greatest anticipated benefit 612. The chatbot selector 168 may alternatively or additionally balance the cost 616 of using one chatbot 152 against the costs 616 of using other chatbots 152. In some embodiments, the chatbot selector 168 may select the chatbot 152 that provides the least cost 616 of use for a given customer interaction. The chatbot selector 168 may alternatively or additionally weigh the costs and benefits associated with each chatbot 152 and may apply an optimization function that maximizes expected revenue, maximizes expected profit, minimizes cost, maximized customer satisfaction, etc. In other words, the optimization function applied by the chatbot selector 608 may consider any number of factors associated with using different chatbots 152 as part of selecting a chatbot 152 for assignment to a customer interaction.

In some embodiments, the candidate chatbot responses 608 may be received and analyzed by the chatbot selector 168 in real-time or near-real-time. As an example, if the input from the customer interaction 604 is received via a text-based communication channel (e.g., chat, social media post, etc.), then text-based candidate chatbot responses 608 may all be analyzed prior to the chatbot selector 168 selecting a particular chatbot 152 for assignment to the interaction and committing the selected chatbot's 152 response back to the customer 116. The analysis performed by the chatbot selector 168 may be done in the background and quickly enough that the response is returned to the customer 116 without the customer observing any significant delay in response time. In other words, the chatbot selector 168 may select a chatbot 152 quickly enough to make it appear as though the chatbot 152 or a human agent represented by the chatbot 152 was selected prior to receiving the input from the customer interaction 604. In another example, but relatedly, if the input from the customer interaction 604 is received via voice, then voice-based candidate chatbot responses 608 (or text versions of possible voice-based responses) may be analyzed by the chatbot selector 168 prior to selecting a particular chatbot 152 for assignment to a customer interaction.

With reference now to FIGS. 7-12, various communications methods will be described in accordance with at least some embodiments of the present disclosure. The communication methods described herein may be combined with one another or steps from one communication method may be used in another communication method without departing from the scope of the present disclosure. Moreover, while certain methods and steps of method will be described as being performed by particular system 100 components, it should be appreciated that any of the components described herein can be configured to perform some or all of the method steps depicted and described herein. Further still, while certain methods are described as having method steps performed in a certain order, it should be appreciated that the order of method steps may be changed or altered without departing from the scope of the present disclosure.

Figure 7:
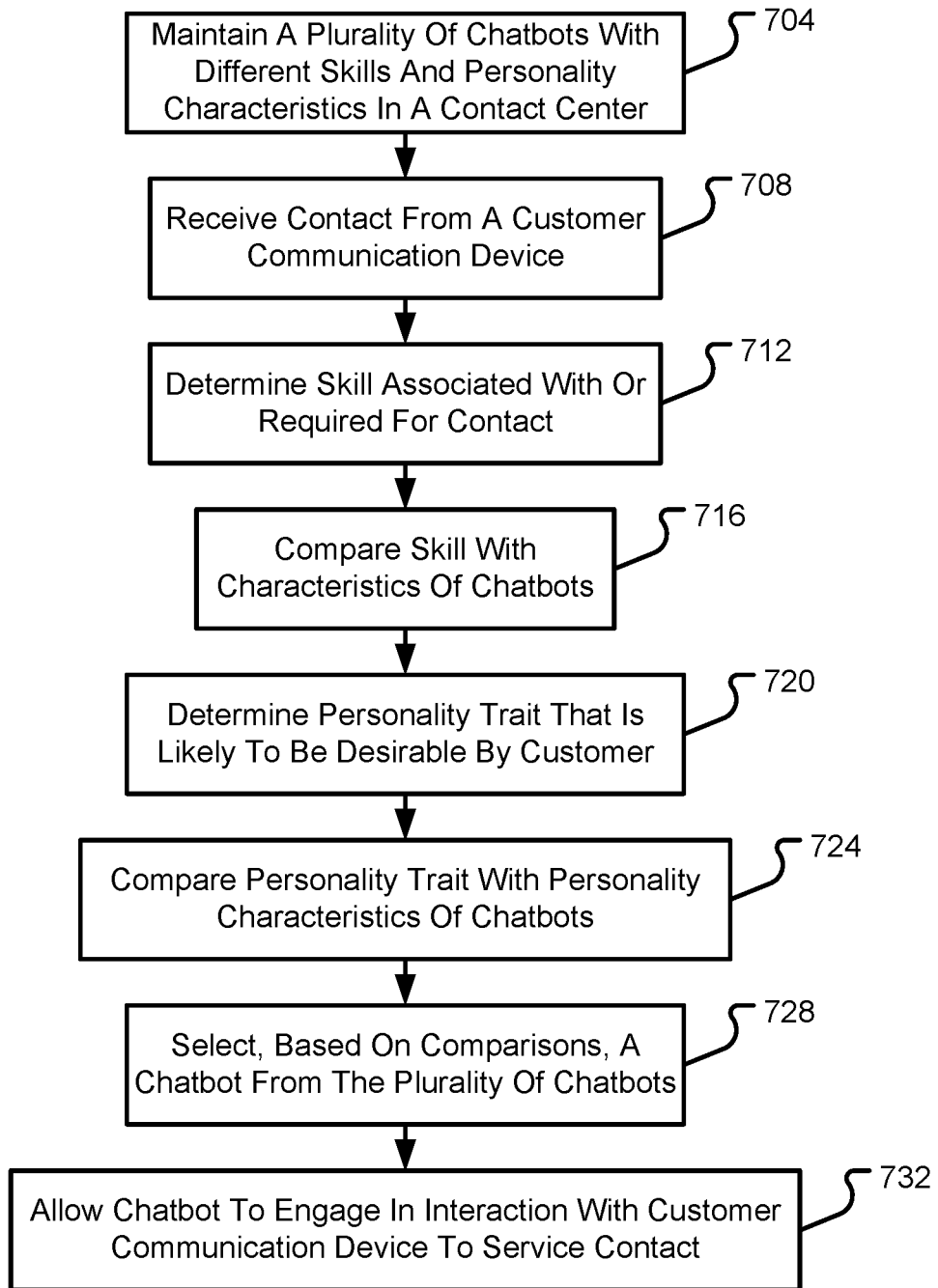
FIG. 7 is a flow chart illustrating a first example communication method in accordance with at least some embodiments of the present disclosure.

Referring now to FIG. 7, a first communication method will be described in accordance with at least some embodiments of the present disclosure. The method begins with a contact center 108 maintaining a plurality of chatbots 152 with different skill sets 312 and different personality characteristics (step 704). Each chatbot 152 may be trained with different training data 504, thereby resulting in each chatbot 152 having different skill sets 312 and personality characteristics. The personality characteristic of a chatbot 152 may be represented by a personality characteristic range 304, which means that a chatbot 152 is capable of providing a particular personality characteristic with a degree of confidence.

The method continues when a contact is received at the contact center 108 from a customer communication device 112 (step 708). The contact may be text-based, voice-based, video-based, web-based, social media-based, etc. The customer communication device 112 may send one or more messages to the contact center 108 via one or more different communication channels. Upon receiving the message(s), the contact center 108 may establish a customer interaction or workflow that facilitate resolution of the customer inquiry (e.g., the reason why the customer 116 contacted the contact center 108). In some embodiments, the contact center 108 may utilize the contact management server 132 to determine a skill or skills associated with the contact (step 712). The skill may be determined based on the content of the message(s) provided by the customer 116, based on a knowledge of the customer 116 from a CRM database, based on a customer's 116 self-selection of a reason for the contact (e.g., service, sales, trouble shooting, technical support, billing, etc.).

The method may continue with the chatbot selector 168 comparing the skill(s) associated with/required by the contact with the skill set 312 of each chatbot 152 in the contact center 108 (step 716). The chatbot selector 168 may also determine, if possible, personality trait(s) 320 that are most likely to be desirable or enjoyed by the customer 116 (step 720). The determination of desirable personality traits 320 may be based upon the content of the contact, based on historical customer information obtained from a CRM database, based on customer 116 responses to questions posed during a customer survey, etc.

The chatbot selector 168 may then compare the personality trait(s) 320 determined to be possibly desirable by the customer 116 with personality characteristics 316 of the plurality of chatbots 152 (step 724). In some embodiments, the chatbot selector 168 may analyze the characteristic ranges 304 of each chatbot 152 as well as the various probability curves associated with different personality characteristics 316 to determine if any chatbot 152 is more likely than other chatbots 152 to provide the personality traits 320 desired by the customer 116.

Based on the comparisons performed in steps 716 and 724, the chatbot selector 168 may select a chatbot 152 from the plurality of chatbots (step 728). The selected chatbot 152 may then be allowed to engage in an interaction with the customer 116 by sending responses to the customer communication device 112, by receiving further customer messages, and then responding to those further customer messages (step 732). In some embodiments, the chatbot 152 may engage in the customer interaction and attempt to progress the interaction through a number of states toward resolution of the customer's inquiry. It should be appreciated that the chatbot selector 168 may be configured to weigh skill-based matching between a chatbot 152 and customer contact over personality characteristic matching considerations. Such weighting may be achieved by enabling the chatbot selector 168 to apply an optimization function that simultaneously considers both skill-based matching and personality characteristic matching. If no chatbot 152 is available to provide the required skills for the customer 116, then the chatbot selector 168 may only consider personality characteristic matching. Analogously, if two chatbots 152 possess the required skills to service a customer interaction, then the chatbot selector 168 may choose between the two chatbots 152 based on which chatbot 152 has personality characteristics 316 that more likely will match the customer's 116 desired personality traits 320.

Figure 8:
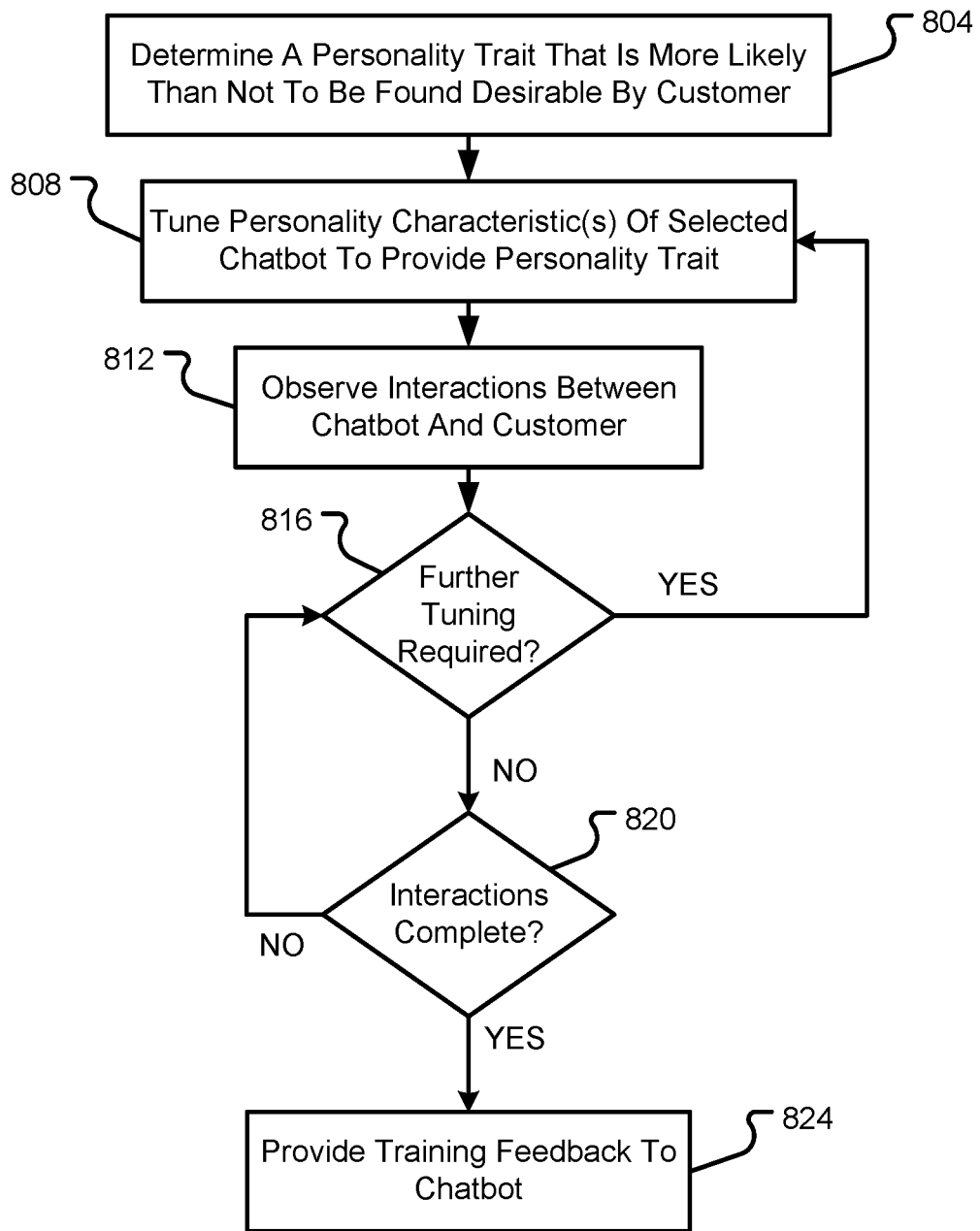
FIG. 8 is a flow chart illustrating a second example communication method in accordance with at least some embodiments of the present disclosure.

Referring now to FIG. 8, a second communication method will be described in accordance with at least some embodiments of the present disclosure. The method begins by determining a personality trait 320 that is more likely than not to be found desirable by a customer 116 during the customer's 116 interactions with the contact center 108 (step 804). The determination of a personality trait 320 may be based upon content of the customer's 116 message, based upon information received from a customer 116 response to a survey question, based upon information obtained from historical customer information (e.g., from a CRM database), or combinations thereof.

The method continues with the chatbot tuning 164 adjusting the current characteristic selection 308 provided by the chatbot 152 that is interacting with the customer 116 or that has been selected for assignment to the customer interaction (step 808). In some embodiments, the chatbot tuning 164 is configured to tune 404 one or multiple different personality characteristics 316 of a selected chatbot 152. The tuning process may be performed in an attempt to have the chatbot 152 provide a personality characteristic or combination of personality characteristics that match the personality trait(s) identified in step 804.

The chatbot tuning 164 may be configured to observe and analyze interactions between the selected chatbot 152 and customer 116 (step 812) to determine if an appropriate match between personality characteristics 316 and personality traits 320 is being achieved. Specifically, the method may include determining if further chatbot tuning is required (step 816). Further tuning may be required if the interactions are determined to be negative or stalled, both of which may result in customer 116 frustration. Further tuning may not be required if the interactions are progressing from one state to the next toward resolution. If further tuning is required, the method may revert back to step 808. If no further tuning is required, possibly because the chatbot 152 is providing the appropriate type of personality characteristics 316 and the current characteristic selection 308 is satisfying the customer's 116 needs, then the method may continue by determining if the customer interactions are complete (step 820). If the customer interactions are not yet complete, then the method returns to step 816. If the customer interactions are complete, then the chatbot tuning may be finalized and the method may proceed by providing any additional training or feedback to the chatbot 152 that was involved in the customer interactions (step 824). This additional step of updated chatbot training may correspond to an optional step.

Figure 9:
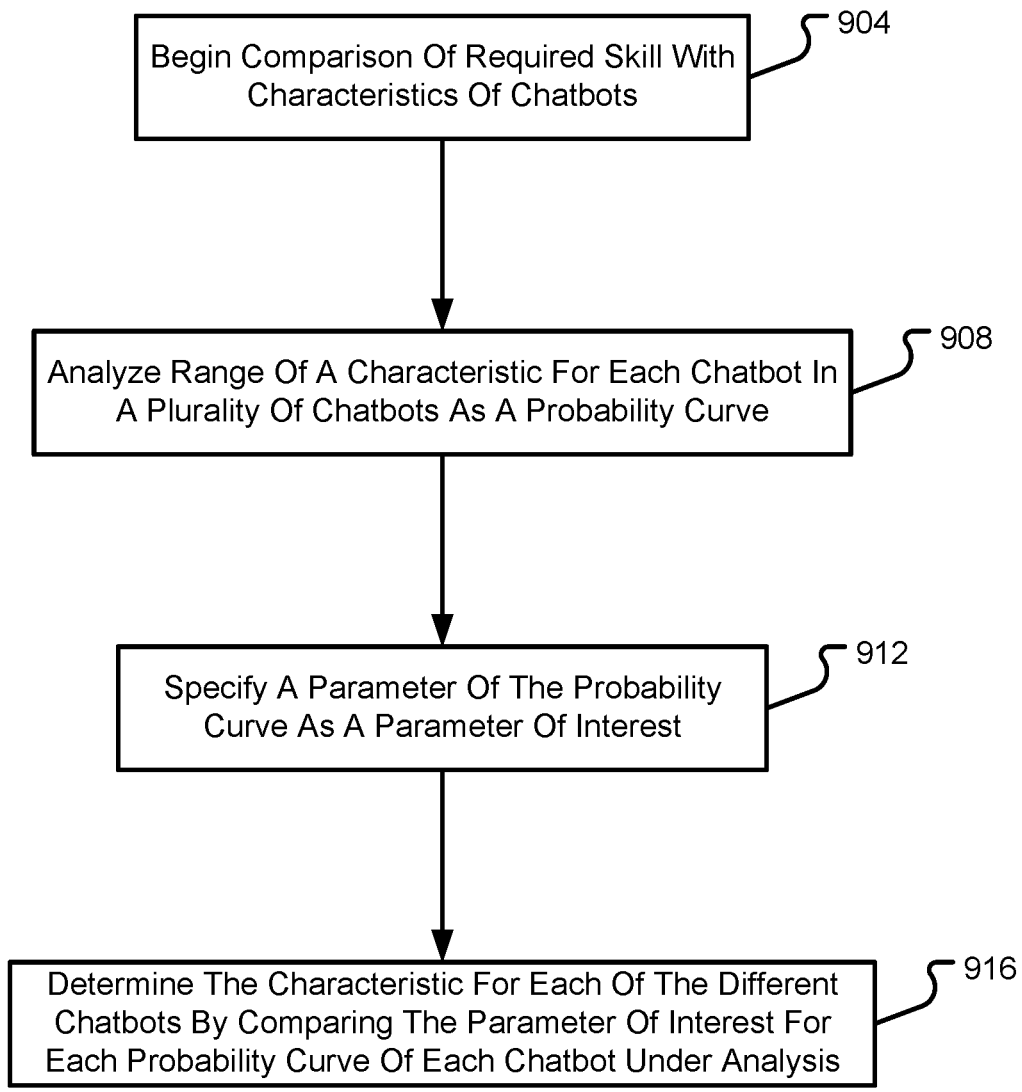
FIG. 9 is a flow chart illustrating a third example communication method in accordance with at least some embodiments of the present disclosure.

Referring now to FIG. 9, a third communication method will be described in accordance with at least some embodiments of the present disclosure. The method begins with a chatbot selector 168 comparing one or more skills required to service a customer contact with a skill set 312 and/or personality characteristics of chatbots 152 available for use in a contact center 108 (step 904). The chatbot selector 168 may analyze, for each of the plurality of chatbots 152, a characteristic range 304, which may be represented by a probability curve (step 908).

The chatbot selector 168, may further specify a parameter of the probability curve as a parameter of interest when analyzing the probability curves for each candidate chatbot 152 (step 912). Parameters of interest may depend upon the nature of the probability curve. A bell curve, for example, may have parameters that include a mean, median, mode, width, standard deviation, degree of symmetry, peak, etc. One of more of the parameters of interest may be used to analyze and select one chatbot 152 from among the plurality of chatbots 152 for assignment to a customer interaction. Specifically, the method may include determining a likelihood that a personality characteristic 316 can be provided by each of the chatbots 152 under analysis. The likelihood that a personality characteristic 316 can be provided by a chatbot 152 may depend upon the parameter of interest for the probability curve under analysis. Analyzing the same parameter of interest for each chatbot's 152 probability curve may enable the chatbot selector 168 to accurately and appropriately select a particular chatbot 152 for assigning to a customer interaction. The analysis performed in this method may also enable the chatbot selector 168 to more likely select a chatbot 152 that provides an appropriate set of personality characteristics to match personality traits desirable for the customer 116.

Figure 10:
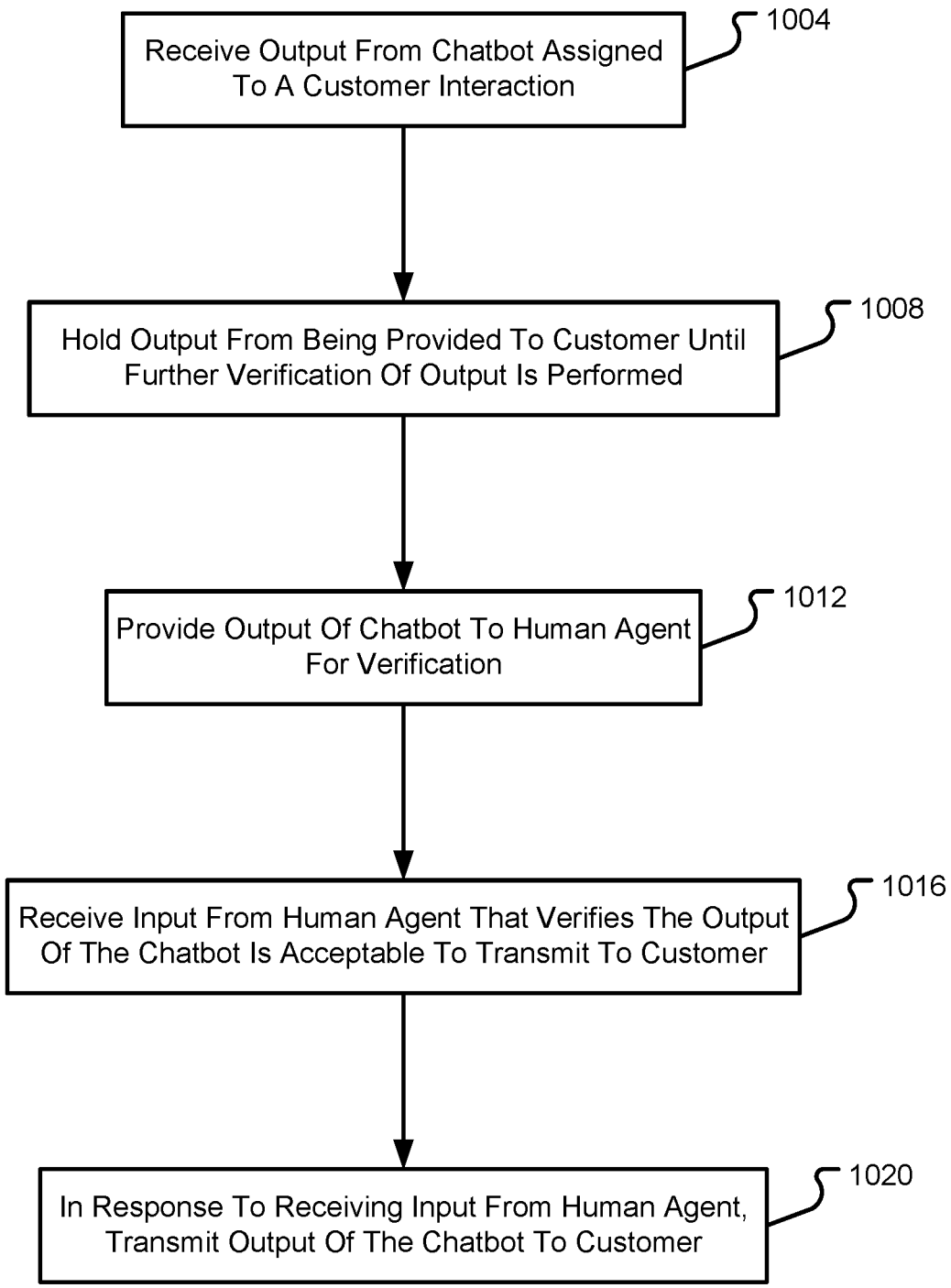
FIG. 10 is a flow chart illustrating a fourth example communication method in accordance with at least some embodiments of the present disclosure.

Referring now to FIG. 10, a fourth communication method will be described in accordance with at least some embodiments of the present disclosure. This method starts by receiving a chatbot output from a chatbot 152 assigned to a customer interaction (step 1004). The output received from the chatbot 152 may be held (e.g., not provided to the customer 116, transmitted to the customer communication device 112, stored in buffer memory, etc.) until a further verification process is performed (step 1008).

The method may continue, while the chatbot 152 output is held, by providing a copy of the chatbot 152 output to a human agent 172 for analysis and verification (step 1012). In some embodiments, the human agent 172 may analyze some or all of the chatbot 152 output to determine if the chatbot 152 output sufficiently addresses or responds to the last customer 116 input received during the customer interaction. In some embodiments, the human agent 172 may analyze the chatbot 152 output for accuracy, relevancy, content, and any other subject or objective criteria. For instance, the human agent 172 may analyze the chatbot 152 output to determine if an appropriate personality characteristic is being applied to match a determined personality trait desired by the customer 116.

The method will continue if the human agent 172 provides an input back to the system verifying that the output of the chatbot 152 is acceptable to transmit to the customer 116 (step 1016). In some embodiments, the human agent 172 may be allowed to edit or modify the output of the chatbot 152 and the edits provided by the human agent 172 may be used as feedback to the system to improve learning and the overall performance of the chatbot 152.

After the human input has been received indicating that the chatbot 152 output is acceptable, the method may continue by transmitting the output of the chatbot 152 to the customer 116 (step 1020). In some embodiments, the output transmitted to the customer 116 may correspond to the edited version or to whatever version of the output that was approved by the human agent 172.

Figure 11:
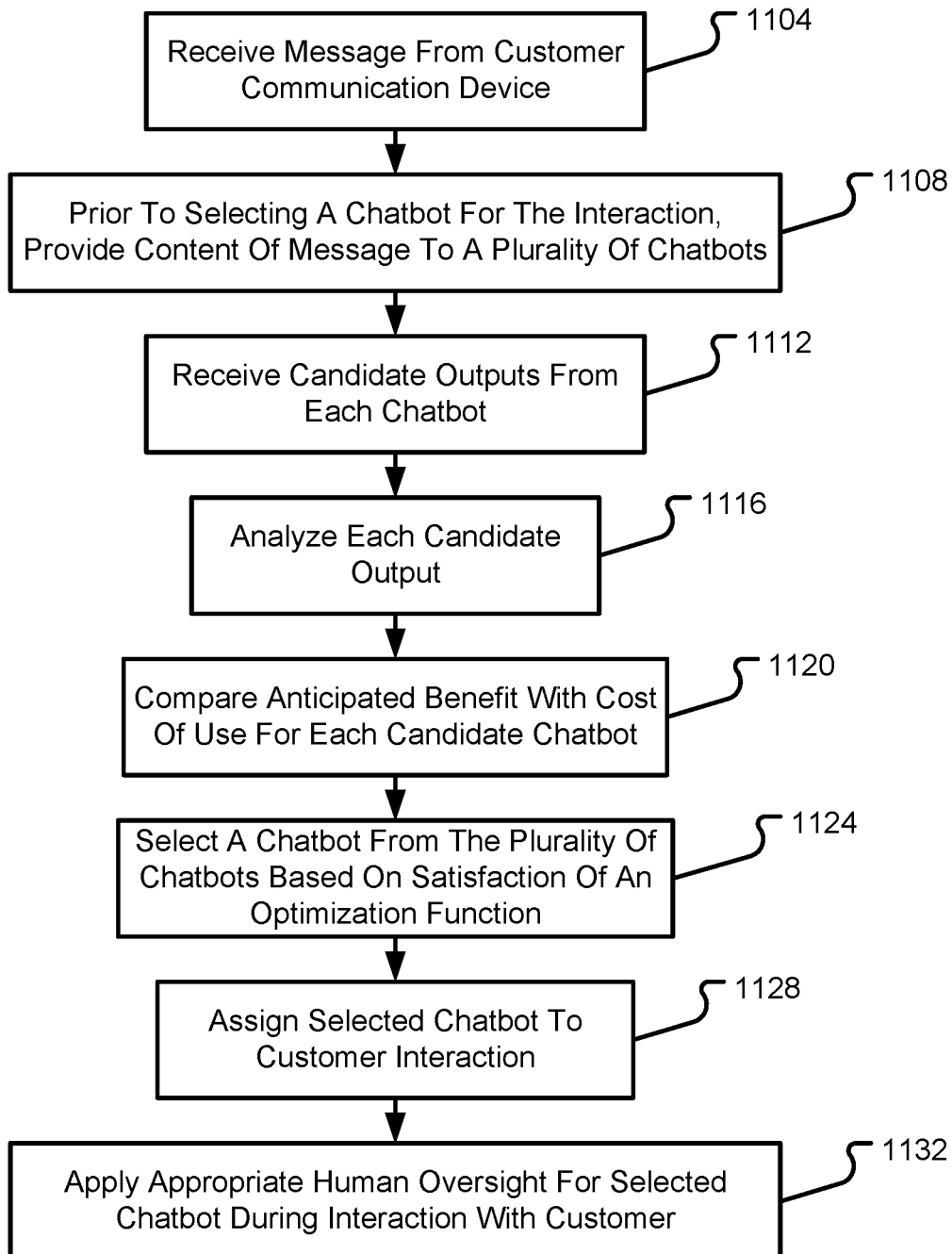
FIG. 11 is a flow chart illustrating a fifth example communication method in accordance with at least some embodiments of the present disclosure.

Referring now to FIG. 11, a fifth communication method will be described in accordance with at least some embodiments of the present disclosure. This method begins by receiving a message from a customer communication device 112 (step 1104). The message may be received on any communication channel supported by the contact center 108 and may use any suitable communication modality (e.g., text, voice, video, social media, web collaboration, etc.).

Prior to selecting a chatbot 152 for responding to the message received from the customer communication device 112, the chatbot selector 168 may provide some or all of the message contents to a plurality of chatbots 152 (step 1108). In some embodiments, the content provided to each chatbot 152 in the plurality of chatbots is the same and may correspond to the entire input from the customer interaction 604.

Each chatbot 152 may produce a candidate output 608 based on the input received from the customer interaction 604 (step 1112). The chatbot selector 168 may be configured to analyze each candidate output 608 including anticipated benefits 612 associated with each candidate output 608 (step 1116). The chatbot selector 168 may also determine costs 616 associated with using each chatbot 152 and compare the anticipated benefits 612 against costs 616 for some or all of the chatbots 152 (step 1120). In some embodiments, the chatbot selector 168 may apply an optimization function to select a chatbot 152 from the plurality of chatbots (step 1124). As an example, the chatbot selector 168 may select the chatbot 152 that best satisfies the optimization function based on each chatbot's 152 anticipated benefit 612 and cost 616 of use.

The selected chatbot 152 may then be assigned to the customer interaction (step 1128). In some embodiments, assignment of the chatbot 152 to the customer interaction may enable the selected chatbot 152 to continue responding to additional messages received from the customer 116. In some embodiments, each message received from the customer 116 may flow through the method of FIG. 11 such that a different chatbot 152 is selected to provide an output to each message received from a customer 116. In this way, no particular chatbot 152 is selected to handle an entire customer interaction, but rather candidate outputs 608 of multiple chatbots 152 are analyzed prior to providing a response to the customer's message. If desired, it may also be possible to apply appropriate human oversight for the selected chatbot during the customer interaction (step 1132). For example, a human agent 172 may review and verify some or all of the responses generated by a chatbot 152 (or different chatbots 152) prior to committing those responses to the customer 116. The inputs from the human agent 172 may be provided back to the chatbot engine 148 as part of retraining or teaching the chatbots 152.

Figure 12:
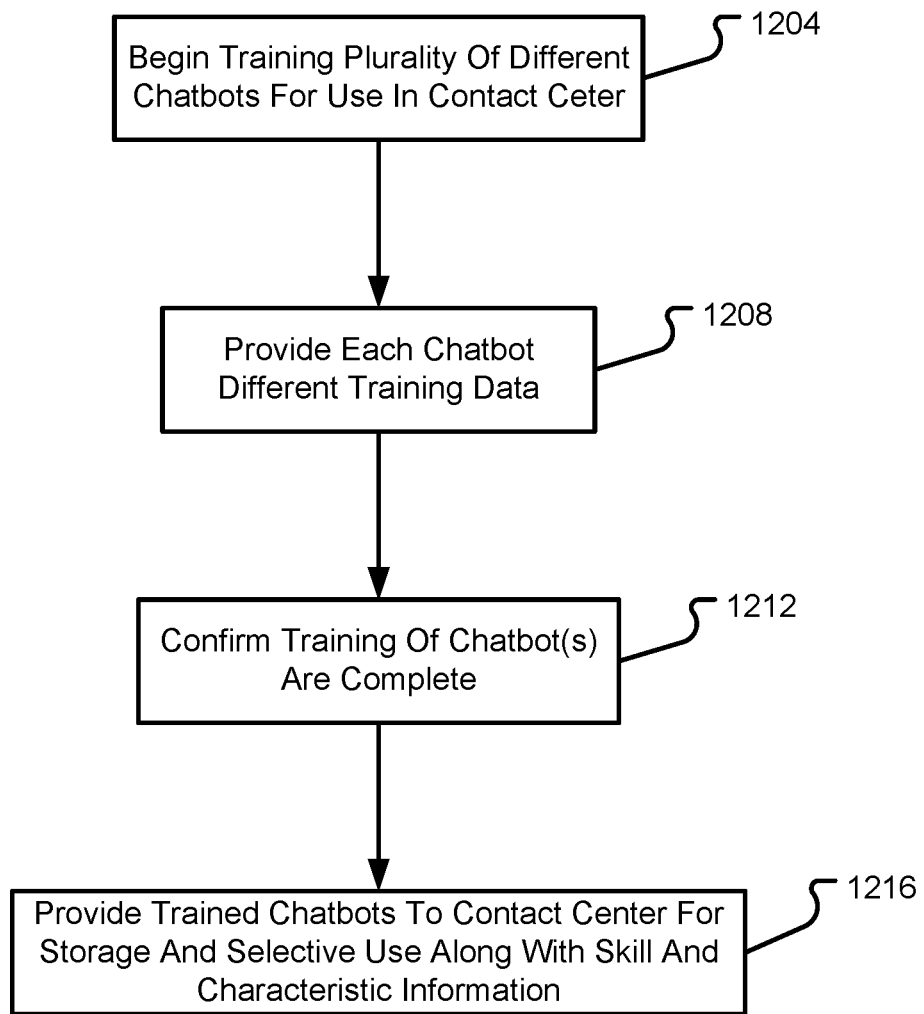
FIG. 12 is a flow chart illustrating a sixth example communication method in accordance with at least some embodiments of the present disclosure.

Referring now to FIG. 12, a sixth communication method will be described in accordance with at least some embodiments of the present disclosure. The method is initiated when training for one or multiple different chatbots 152 is initiated by the chatbot engine 148 (step 1204). The training method may correspond to an initial training method for a new chatbot 152 or to a retraining of a chatbot 152 already in use by the contact center 108.

The training method may continue by providing each chatbot 152 being trained with different training data 504 (step 1208). As an example, one chatbot 152 may receive first training data that is specific to a first skill, a first personality characteristic, etc. For instance, the first training data 504 may correspond to contact center interactions (text, voice, video, web collaboration, social media, etc.) related to customer support or technical support for a particular product. The chatbot 152 that is trained on the first training data 504 may be trained to develop a first skill (e.g., customer support skill or technical support skill). Second training data 504 may be applied to a different chatbot 152 to develop a second skill. As an example, the second training data 504 may correspond to contact center interactions related to billing inquiries. The chatbot 152 that is trained on the second training data 504 may be trained to develop a second skill (e.g., billing skill). As another example, yet another chatbot 152 may be trained on third training data 504, which corresponds to contact center interactions for sales. The chatbot 152 trained with the third training data 504 may develop a third skill (e.g., a sales skill). In this way, different chatbots 152 may be trained to have different skill sets 312, which may be analyzed during a chatbot selection process.

The training method may complete when the chatbot engine 148 confirms that all chatbots 152 have been satisfactorily trained on their respective training data (step 1212). Confirmation that training is complete may be based on the chatbot 152 receiving and ingesting all training data 504 and/or confirming that the chatbot 152 now possesses the desired skill and/or personality characteristic.

The method may then continue by providing each of the trained chatbots 152 to the contact center 108 for storage and selective use during contact center 108 operations (step 1216). In some embodiments, each chatbot 152 may be stored along with information describing the chatbot's 152 capabilities (e.g., characteristic range 304, skill set 312, etc.). The information describing the chatbot's 152 capabilities may be stored such that the chatbot selector 168 can easily and quickly access the information to make a chatbot selection for customer interactions, newly-received customer messages, and the like.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of processing messages received in a communication system, the method comprising:
    receiving a contact from a customer communication device in a contact center;
    selecting a first chatbot from a plurality of chatbots;
    assigning the contact to the first chatbot, wherein the first chatbot is configured to engage in an interaction with the customer communication device for purposes of servicing the contact, and wherein the first chatbot comprises an adjustable personality characteristic;
    determining a personality trait that is more likely than not to be found desirable by a customer that initiated the contact; and
    tuning the adjustable personality characteristic of the first chatbot to provide the determined personality trait.

2. The method of claim 1, wherein the adjustable personality characteristic of the first chatbot is tuned in real-time.

3. The method of claim 2, wherein the adjustable personality characteristic of the first chatbot comprises at least one of assertive, passive, quiet, permissive, conscientious, agreeable, extraverted, and introverted.

4. The method of claim 1, further comprising:
    analyzing the interaction between the first chatbot and the customer communication device;
    determining that the adjustable personality characteristic of the first chatbot is to be further adjusted based on the analyzing of the interaction between the first chatbot and the customer communication device; and
    further tuning, during the interaction, the adjustable personality characteristic of the first chatbot.

5. The method of claim 1, further comprising:
    providing an output of the first chatbot to a human agent prior to allowing the output to be transmitted to the customer communication device;
    receiving an input from the human agent that verifies the output of the first chatbot as acceptable to transmit to the customer communication device; and
    in response to receiving the input from the human agent, transmitting the output of the first chatbot to the customer communication device.

6. The method of claim 5, wherein the output comprises a text-based output, and wherein the output is transmitted via a digital communication channel.

7. The method of claim 5, wherein the output comprises an audible output, and wherein the output is transmitted via a voice or video communication channel.

8. The method of claim 5, wherein the input from the human agent is used as training data for the first chatbot.

9. The method of claim 1, wherein each of the plurality of chatbots comprise different personality characteristics, and wherein the first chatbot is selected from the plurality of chatbots based on a match between the adjustable personality characteristic of the first chatbot better matching the personality trait when compared to an adjustable characteristic of each of the plurality of other chatbots.

10. A communication system, comprising:
a processor; and
computer memory storing data thereon that enables the processor to:
receive a contact from a customer communication device in a contact center;
select a first chatbot from a plurality of chatbots;
assign the contact to the first chatbot, wherein the first chatbot is configured to engage in an interaction with the customer communication device for purposes of servicing the contact, and wherein the first chatbot comprises an adjustable personality characteristic;
determine a personality trait that is more likely than not to be found desirable by a customer that initiated the contact; and
tune the adjustable personality characteristic of the first chatbot to substantially match the determined personality trait.

11. The communication system of claim 10, wherein the adjustable personality characteristic of the first chatbot is tuned in real-time.

12. The communication system of claim 11, wherein the adjustable personality characteristic of the first chatbot comprises at least one of assertive, passive, quiet, permissive, conscientious, agreeable, extraverted, and introverted.

13. The communication system of claim 10, wherein the data further enables the processor to:
analyze messages exchanged between the first chatbot and the customer communication device;
determine that the adjustable personality characteristic of the first chatbot is to be further adjusted based on the analysis of the messages exchanged between the first chatbot and the customer communication device; and
further tune, during the interaction, the adjustable personality characteristic of the first chatbot.

14. The communication system of claim 13, wherein the data further enables the processor to:
provide an output of the first chatbot to a human agent prior to allowing the output to be transmitted to the customer communication device;
receive an input from the human agent that verifies the output of the first chatbot as acceptable to transmit to the customer communication device; and
in response to receiving the input from the human agent, transmit the output of the first chatbot to the customer communication device.

15. The communication system of claim 14, wherein the input from the human agent is used as training data for the first chatbot.

16. The communication system of claim 10, wherein the contact comprises a text-based message received via a digital communication channel.

17. The communication system of claim 10, wherein the contact is received via a voice or video communication channel.

18. The communication system of claim 11, wherein the processor and computer memory are provided as a quantum computer.

19. A contact center, comprising:
a first tunable chatbot stored in memory; and
a chatbot tuning function that controls and adjusts a personality characteristic of the first tunable chatbot selected from a plurality of tunable chatbots while the first tunable chatbot is interacting with a customer via a customer communication device.

20. The contact center of claim 19, wherein the chatbot tuning function adjusts the personality characteristic of the first tunable chatbot based on a desired personality trait associated with the customer, wherein the personality characteristic of the first tunable chatbot is adjusted by the chatbot tuning function in real-time, and wherein the personality characteristic comprises at least one of assertive, passive, quiet, permissive, conscientious, agreeable, extraverted, and introverted.

* * * * *